United States Patent [19]
Hoffman

[11] 3,967,692
[45] July 6, 1976

[54] SNOWMOBILE SUSPENSION SYSTEM

[76] Inventor: Elmer H. Hoffman, 728 Wilson St., Oconomowoc, Wis. 53066

[22] Filed: Sept. 26, 1974

[21] Appl. No.: 509,692

[52] U.S. Cl. .............................. 180/5 R; 244/108
[51] Int. Cl.² ........................................ B62M 27/00
[58] Field of Search......... 180/5 R; 244/108, 104 R, 244/104 CS, 104 FP

[56] References Cited
UNITED STATES PATENTS

| | | | |
|---|---|---|---|
| 1,891,188 | 12/1932 | Stalb | 180/5 R |
| 1,892,064 | 12/1932 | Markey | 180/5 R |
| 3,854,541 | 12/1974 | Hollnagel | 244/108 |

Primary Examiner—Philip Goodman
Assistant Examiner—John A. Carroll
Attorney, Agent, or Firm—Andrus, Sceales, Starke & Sawall

[57] ABSTRACT

An improved snowmobile suspension system includes a pair of rails mounted on each of the skis supporting the front end of a snowmobile. A link is pivotally mounted between the rails and the snowmobile steering gear bracket and has a lever arm biased by a resilient means, such as a coil spring, for positioning the link with respect to the skis. A second resilient means is mounted between the rear end of the ski and the snowmobile steering gear bracket for positioning the ski with respect to the snowmobile.

22 Claims, 5 Drawing Figures

U.S. Patent   July 6, 1976   Sheet 1 of 2   3,967,692
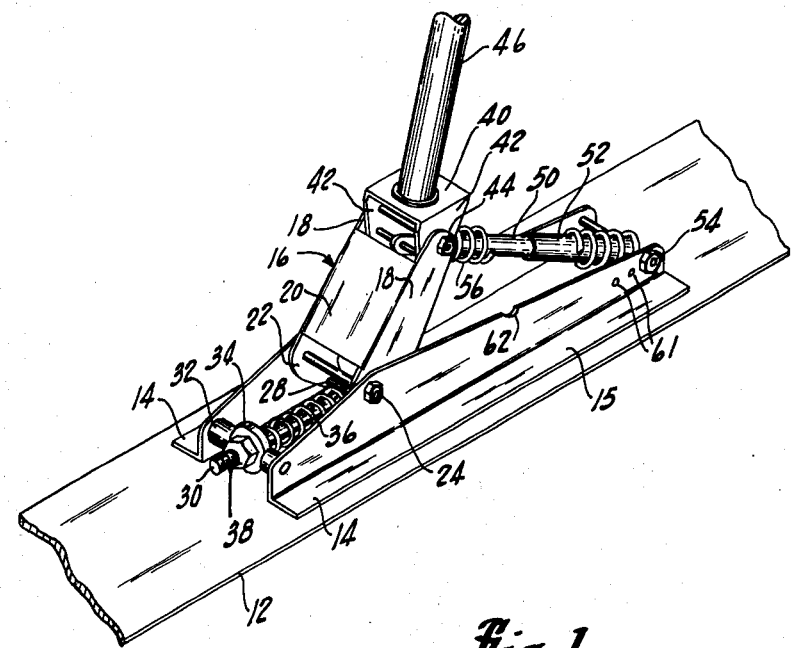
Fig. 1
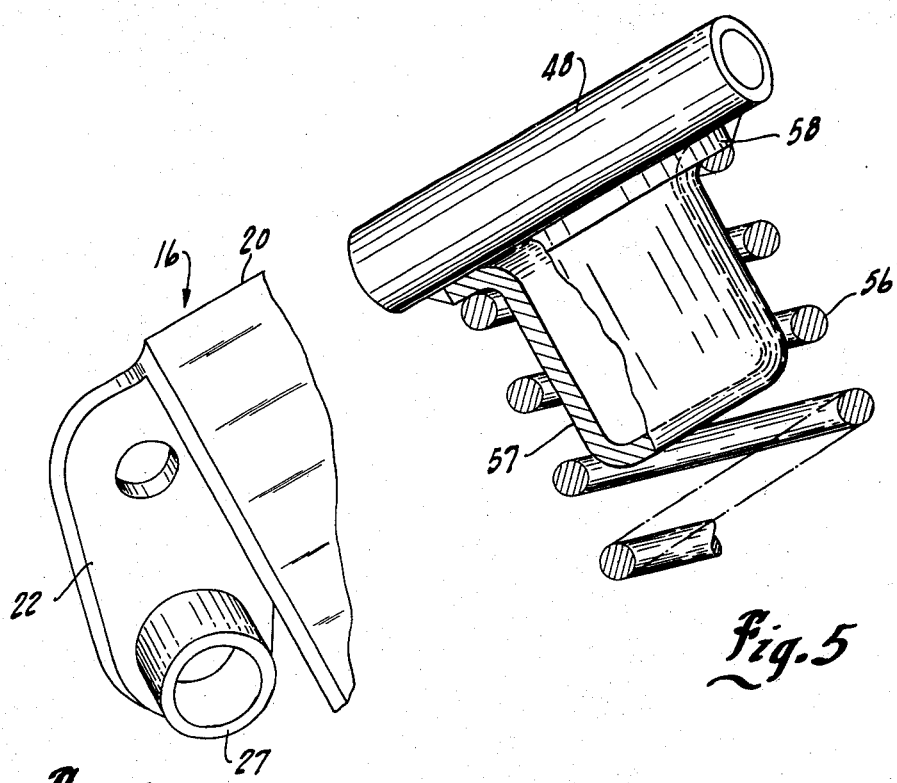
Fig. 3
Fig. 5

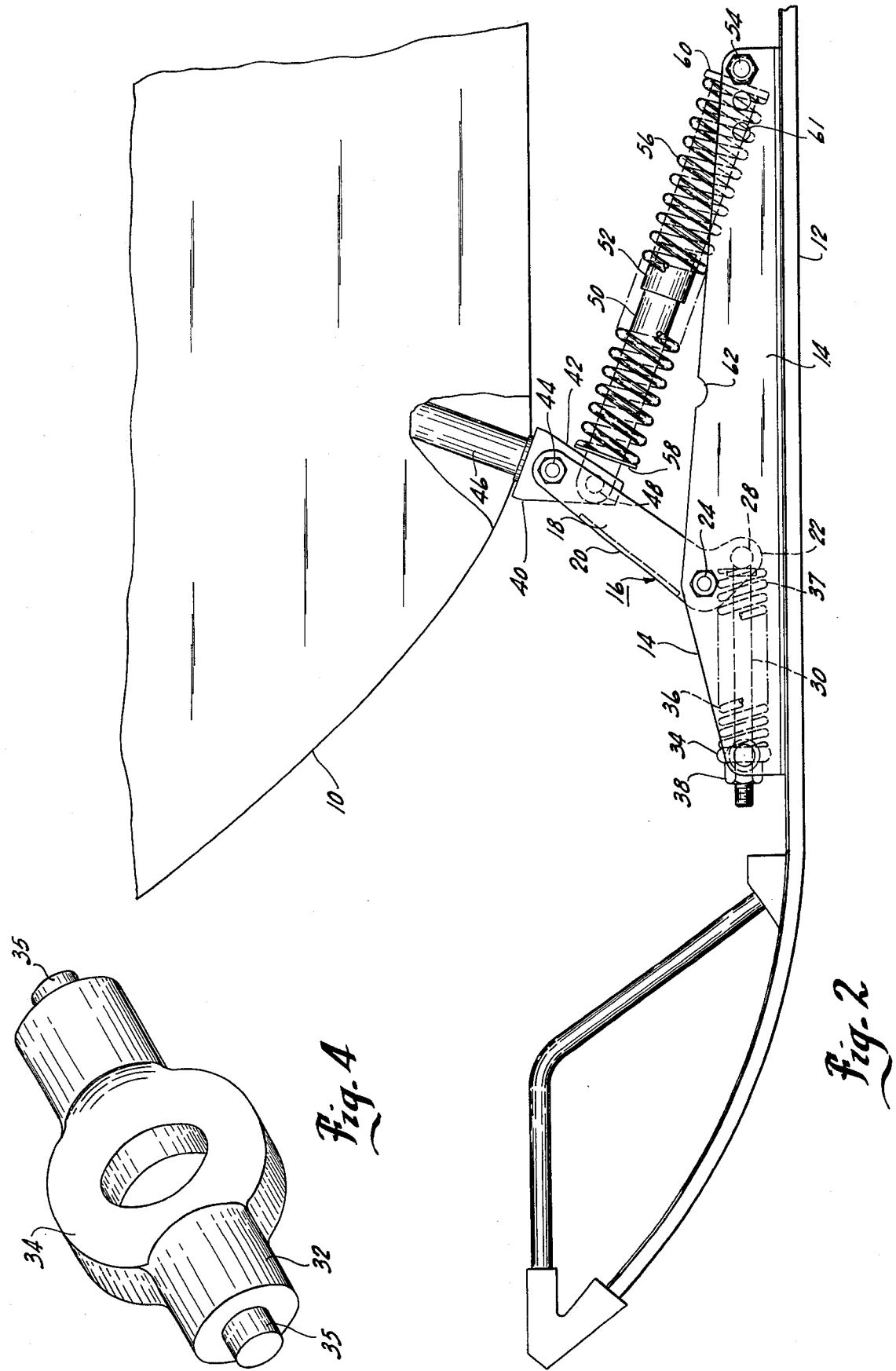

SNOWMOBILE SUSPENSION SYSTEM

BACKGROUND OF THE INVENTION 1. Field of the Invention

The present invention relates to improved suspensions systems for snowmobiles.

BACKGROUND OF THE INVENTION 2. Description of the Prior Art

Snow vehicles, such as snowmobiles, conventionally have a driven endless belt which supports the rear end of the snowmobile and a pair of parallel, laterally spaced, skis which support the front end of the vehicle and by means of which the snow vehicle may be steered. A suspension system is interposed between the skis and the steering gear to absorb impacts applied to the skis as the vehicle travels over uneven surfaces.

However, when the snowmobile is operated over bumpy terrain, the skis are frequently jolted off the snow into the air. When the skis are thus freed, there is a tendency for the rear end of the skis to rotate upwardly against the forward portions of the snowmobile, often damaging either or both of the skis and snowmobile. After striking the snowmobile the skis may rotate away from the snowmobile so that when the skis regain contact with the ground, they land first on the heels of the skis. This condition can also produce damage to the skis.

SUMMARY OF THE PRESENT INVENTION

It is, therefore, the object of the present invention to provide an improved suspension for snowmobile skis and more particularly one which urges the skis into the level position when they are in the unsupported, air borne condition. In so maintaining the skis level, the improved suspension system reduces rotary movement of the skis toward the forward portions of the snowmobile and impact and damage to either of these elements.

The stiffness of the improved suspension system, and hence the ride imparted to the snowmobile, may be easily altered.

Briefly, the present invention contemplates a suspension system mounting skis below the forward portion of a snow vehicle, such as a snowmobile. A link having one end pivotally mounted on the ski has the other end pivotally mounted on the vehicle. A resilient means coupled between the link and the ski positions the link in an over center or knee action position. The resilient means also resists relative pivotal movement between the ski and the link tending to raise the back ends of the skis. A second resilient means mounted between the rear end of the ski and the snowmobile similarly resists pivotal movement of the skis and controls the ride imparted to the snowmobile by the suspension system.

BRIEF DESCRIPTION OF THE DRAWING

FIG. 1 is a perspective view of the improved suspension system of the present invention and the associated snowmobile ski.

FIG. 2 is an elevational view of the suspension system of the present invention.

FIG. 3 is a fragmentary perspective view of the lower portion of the link member of the suspension system.

FIG. 4 is a perspective view of a cross bar element employed in the suspension system of the present invention.

FIG. 5 is a fragmentary elevational view of a means for mounting the second resilient means in the suspension system.

DESCRIPTION OF THE PREFERRED EMBODIMENT

The numeral 10 shown In FIG. 2 indicates the forward portion of the snowmobile containing the engine, steering gear, and other apparatus. Forward portion 10 of the snowmobile is supported by a pair of skis 12, one of which is shown in the Figures. A pair of laterally spaced, longitudinal rails 14 have flanges 15 bolted, welded, or otherwise affixed to the uppr surface of the ski 12. In addition to serving as a means for attaching portions of the suspension system, flanges 15 also serve to stiffen ski 12.

Link 16 comprises a pair of side members 18 joined by cross member 20. Side members 18 are elongated and terminate, at their lower ends, in short bent lever arm 22 oriented at an angle to the longitudinal dimension of side members 18. Link 16 may be formed from sheet metal of appropriate gauge bent to the configuration described above.

Link 16 is pivotally mounted adjacent its lower end by bolt 24 which extends through rails 14 and side members 18. Bolt 24 may be provided with the appropriate washers, if desired, to facilitate the action of link 16. The pivotal joinder of link 16 to rails 14 is such that lever arms 22 are positioned below the pivot point provided by bolt 24 and between rails 14.

A laterally extending rod 28 is journalled in the lower ends of lever arms 22. Rod 28 may be solid or tubular as desired. The journals in lever arms 22 for rod 28 may be obtained by forming the metal of lever arms 22 into the inwardly extending collars 27 shown in FIG. 3. Rod 28 is retained in collars 27 by the inner surfaces of rails 14.

A longitudinal shaft 30 is fastened to rod 28 at its center, as by welding. Shaft 30 also assists in retaining rod 28 in collar 27 and facilitates the preassembly of link 16, rod 28, and shaft 30. Shaft 30 extends from rod 28 through a hole in cross bar 32 mounted in rails 14. Cross bar 32 may be flattened, as at 34, in the portions surrounding the hole through which shaft 30 extends. The ends of cross bar 30 are formed into trunnions 35 for mounting cross bar 32 in rails 14.

A compressive load resisting member, such as coil spring 36 surrounds shaft 30 between rod 28 and cross bar 32. Collar 37 may be mounted on shaft 30 to assist in positioning coil spring 36. The forward end of shaft 30 is threaded and contains nut 38. One side of the flattened portion 34 may serve as a bearing for coil spring 36 while the other side serves as a bearing for nut 38. The position of nut 38 on shaft 30 controls both the position of link 16 with respect to ski 14 and the extension of spring 30. Spring 30 is compressed by the action of lever arm 22 during relative rotation of ski 12 with respect to link 16 about bolt 24 in the counter clockwise direction, when the structure is viewed as shown in FIG. 2. This compression resists such motion which raises the rear end of ski 12 toward the forward portion 10 of the snowmobile. Nut 28 prevents rotation in the other direction by contact with bar 32. The position of link 16 with respect to ski 12 is such that the link is angularly displaced from the perpendicular. The upper end of link 16 is typically inclined 15° toward the rear end of ski 12.

The upper end of link 16 is pivotally mounted in bracket 40. For this purpose, bracket 40 contains a pair of extensions 42 which fit inside side members 18 of link 16. Extensions 42 and side members 18 are joined by bolt 44 near the upper ends of extensions 42. Bracket 40 also contains canted shaft 46 which extends into the forward portion 10 of the snowmobile and is connected to the snowmobile steering gear.

The rear end of ski 12 is coupled to bracket 40 through a second compressive load resisting member which resists counter clockwise rotation of ski 12 shown in FIG. 2. Such a member may comprise a pair of telescoping tubes surrounded by a coil spring. For example, bar 48 may be pivotally mounted in the lower ends of extensions 42 of bracket 40 and below bolt 44. Preferably, bar 48 should be out of vertical alignment with bolt 44. This may be accomplished by placing bolt 44 and bar 48 on a geometric extension of the axis of canted shaft 46. Tube 50 is mounted in the center portion of bar 48. Tube 50 fits inside tube 52 which is fastened to bolt 54 pivotally mounted between the rear ends of rails 14. A coil spring 56 surrounds tubes 50 and 52 and is retained in position by collar 58 on tube 50 and collar 60 on tube 52. A plurality of holes 61 are provided at the rear end of rails 14 to adjust the compression of spring 56. Spring 56 is larger and stiffer than spring 36. If desired, spring 56 is sufficiently stiff that a short cup like member 57, such as is shown in FIG. 5, may be used to couple spring 56 to bar 48 and bolt 54. A shock absorber may be used for as the compressive load resisting member.

In operation, as ski 12 moves upward while remaining generally parallel to the position shown in FIG. 2, responsive to loads placed on the snowmobile or to bumps in the surface being traverse by the snowmobile, link 16 pivots in the clockwise direction about both bolts 24 and 44. Lever arm 22 of link 18 moves toward cross member 32 compressing spring 36. The rear end of ski 12, including bolt 54 moves toward bracket 40 compressing spacing 56. The compression of springs 36 and 56 serves to absorb the forces exerted on the suspension system by a snowmobile load or the bump. The ski also moves slightly forward due to the knee action of link 16. This is advantageous in turning in that the more heavily loaded outside ski moves ahead of the inside ski. Notches 62 may be provided in rails to avoid contact between bolt 44 and the rails.

Any tendency of ski 12 to rotate out of the level position, as during the hurdling of objects or otherwise, is also resisted by the compression of springs 36 and 56. Rotation in the counter clockwise direction shown in FIG. 2 tending to move the rear end of ski 12 toward forward portions 10 of the snowmobile is resisted by the compression of both springs 36 and 56. Due to the stiffness of spring 56 most of such movement occurs as bolt 24 resulting in the compression of both the springs. Pivotal movement of ski 12 in the clockwise direction tending to lower the rear end of the ski occurs at bolt 44 and is resisted by the compression of spring 56. This prevents the possibility of damage to both forward portions and ski 12 under such circumstances.

The position of nut 38 on the threaded forward end of shaft 30 controls the angular position of link 16, distance between ski 12 and the forward portion 10 of the snowmobile, and the stance of the suspension system. The less nut 38 is threaded on the forward end of the shaft 30 the more upright will be link 16 and the greater will be the distance between ski 12 and forward portion 10. As noted supra the length of shaft 30 is such that link 16 cannot be moved to the upright position which would prevent the knee action of the suspension system.

The position of bolt 54 at the rear end of ski 12 may be adjusted to alter the compression of large spring 56 and the ease with which link 16 may be rotated in the clockwise direction. This also controls the softness of the ride provided by suspension system 10.

Various modes of carrying out the invention are contemplated as being within the scope of the following claims particularly pointing out and distinctly claiming the subject matter which is regarded as the invention.

I claim:

1. A suspension system for mounting an elongated ski like member having forward and rear ends below a vehicle comprising:
    a link having a lower end including a pivot point rotatably mounted on a central portion of the ski and an upper end pivotally secured in means on the vehicle, the mounting of said link providing movement in the vertical longitudinal plane of the ski;
    first compressively resilient means coupled between said lower end of said link and the ski for inclinedly positioning said link relative to the ski and for resisting first relative pivotal movement between the ski and said link about said pivot point exemplified by a raising of the rear end of the ski; and
    second compressively resilient means coupled between the rear end of the ski and said means pivotally securing the upper end of said link for resisting rotation of the ski which raises the rear end of the ski.

2. The suspension system according to claim 1 wherein said first resilient means is coupled to said link at a location thereon which provides a moment arm about said pivot point for resisting said first relative pivotal movement.

3. The suspension system according to claim 2 wherein said link has a lever arm extending from said pivot point on said link and said first resilient means is coupled to said lever arm.

4. The suspension system according to claim 1 wherein said link has stop means operatively associated therewith for preventing rotation of the ski which raises the forward end of the ski.

5. The suspension system according to claim 4 wherein said stop means is further defined as operatively associated with said first resilient means for preventing second relative pivotal movement between the ski and said link about said pivot point exemplified by a raising of the forward end of the ski.

6. The suspension system according to claim 5 wherein said first resilient means includes a member of predetermined length coupled to said link and being slidably received in retaining means on the ski, said member having a stop engagable with said retaining means for preventing said second relative pivotal movement and for establishing the inclined position of said link.

7. The suspension system according to claim 6 wherein said member comprises a shaft having operatively associated therewith spring means for resiliently resisting said first relative pivotal movement and for urging said stop into engagement with said retaining means.

8. The suspension system according to claim 5 wherein said resilient means is adjustable in length for controlling the inclined position of said link with respect to the ski.

9. The suspension system according to claim 8 wherein said adjustable length resilient means is joined to the ski at a fixed location.

10. The suspension system according to claim 1 wherein said upper end of said link is rearwardly inclined with respect to the ski.

11. The suspension system according to claim 7 wherein said shaft is adjustable in length for determining the inclined position of the link with respect to the ski.

12. The suspension system according to claim 7 wherein said spring means is a coil spring surrounding said shaft between said link and said retaining means, said spring being compressible for resisting said first relative pivotal movement.

13. The suspension system according to claim 1 wherein said first resilient means is compressible for resisting said first relative pivotal movement and said second resilient means is compressible for resisting said rotation, said second resilient means having a greater compressive resistance than said first resilient means.

14. The suspension system according to claim 1 including a bracket means for pivotally securing the upper end of said link to the snow vehicle, said second resilient means being coupled to said bracket means.

15. The suspension system according to claim 14 wherein said upper end of said link and said second resilient means are mounted out of vertical alignment in said bracket means.

16. The suspension system according to claim 1 wherein said second resilient means comprises a spring means compressible for resisting said rotation movement.

17. The suspension system according to claim 16 wherein said spring means comprising said second resilient means include stabilizing means.

18. The suspension system according to claim 1 wherein said second resilient means comprises a shock absorber.

19. The suspension system according to claim 1 wherein said suspension system includes a pair of spaced longitudinal rails mounted on said ski and said link is rotatably mounted between said rails.

20. The suspension system according to claim 3 wherein said suspension system includes a pair of spaced longitudinal rails mounted on said ski and said link is rotatably mounted between said rail and wherein said lever arm is located between said rails.

21. The suspension system according to claim 19 wherein said link has a pair of laterally spaced side members abutting said rails.

22. The suspension system according to claim 21 wherein said side members contain lever arms extending from said pivot point on said link and located between said rails and wherein said first resilient means is pivotally mounted between said lever arms and retained there by said rails.

* * * * *